(12) United States Patent
Bellamy et al.

(10) Patent No.: US 8,732,616 B2
(45) Date of Patent: May 20, 2014

(54) MARK-BASED ELECTRONIC CONTAINMENT SYSTEM AND METHOD

(75) Inventors: Rachel K. E. Bellamy, Bedford, NY (US); Michael Desmond, White Plains, NY (US); Jacquelyn A. Martino, Cold Spring, NY (US); Paul M. Matchen, Bethel, CT (US); Harold L. Ossher, South Salem, NY (US); John T. Richards, Hawthorne, NY (US); Calvin B. Swart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/239,721

(22) Filed: Sep. 22, 2011

(65) Prior Publication Data

US 2013/0080947 A1    Mar. 28, 2013

(51) Int. Cl.
G06F 15/00    (2006.01)
G06F 13/00    (2006.01)

(52) U.S. Cl.
USPC ............................ 715/835; 715/853; 715/702

(58) Field of Classification Search
USPC .................. 715/702, 835, 851–853, 764, 846
See application file for complete search history.

(56) References Cited

U.S. PATENT DOCUMENTS

| | | | |
|---|---|---|---|
| 6,551,357 B1 | 4/2003 | Madduri | |
| 6,801,229 B1 | 10/2004 | Tinkler | |
| 7,162,484 B2 | 1/2007 | Grobler et al. | |
| 2006/0200662 A1 | 9/2006 | Fulton et al. | |
| 2006/0224610 A1 | 10/2006 | Wakeam et al. | |
| 2006/0277486 A1 | 12/2006 | Skinner | |
| 2007/0033279 A1* | 2/2007 | Battat et al. | 709/224 |
| 2008/0109405 A1 | 5/2008 | Tedesco et al. | |
| 2008/0184101 A1 | 7/2008 | Joshi et al. | |
| 2009/0244089 A1 | 10/2009 | Gadd et al. | |
| 2010/0095248 A1 | 4/2010 | Karstens | |
| 2010/0122154 A1 | 5/2010 | Howell et al. | |
| 2010/0313125 A1* | 12/2010 | Fleizach et al. | 715/702 |
| 2011/0119685 A1 | 5/2011 | Schaeffer et al. | |
| 2011/0252375 A1 | 10/2011 | Chaudhri | |

FOREIGN PATENT DOCUMENTS

| | | | |
|---|---|---|---|
| WO | WO 2005/038648 A1 | 4/2005 | |
| WO | WO 2010/141991 A1 | 12/2010 | |

OTHER PUBLICATIONS

Trzaska, Mariusz; "senseGUI—A Declarative Way of Generating Graphical User Interfaces", ICSOFT, Porto, Portugal Jul. 5-8, 2008, pp. 71-76.
IBM et al.; "Method and System for a Person Based Marker Display in an Instant Messaging System", IPCOM000192687D, Jan. 28, 2010, Abstract.
MSDN Active Document Containment, 2003 http://msdn.Microsoft.com/en-us/library/6bzz39ft%28v=vs.71%29.aspx.
International Search Report mailed Jul. 19, 2012 in related International Application No. PCT/US12/36995.

* cited by examiner

*Primary Examiner* — Cao "Kevin" Nguyen
(74) *Attorney, Agent, or Firm* — Scully, Scott, Murphy & Presser, P.C.; Louis J. Percello, Esq.

(57) ABSTRACT

A mark-based containment system, in one aspect, may include a graphical user interface operable to receive an indication of a mark as a container marking, attribute one or more container attributes to the container marking, and store the container mark and the container attributes associated with the container mark.

24 Claims, 8 Drawing Sheets

MARK-BASED ELECTRONIC CONTAINMENT SYSTEM AND METHOD

FIELD

The present application relates generally to computers, and computer applications, graphical user interfaces, and more particularly to a mark-based electronic containment system.

BACKGROUND

Users of computer systems and computer applications routinely make use of hierarchical storage schemes such as nested "folders" to manage electronic "documents." A document can refer to entities such as the output of word processing, spreadsheet, and drawing programs, notes sent or received in electronic mail, instant message conversations, and others. The use of "tags" has also become common as a means for more flexibly denoting relationships between a document and a generally non-hierarchical set of categories. Beyond direct containment specification, the current state of the art also allows for the subsequent finding of documents by searching for tags, free text strings, or other attributes such as predominant color or orientation of a major axis in an image retrieval system.

While useful, all such schemes constrain how a user can create containers and how they may appear. For example, file folders can be created on an electronic "desktop" or within another folder by means of a menu selection or keyboard shortcut. Files and folders can be dragged and dropped into existing folders to denote containment. Documents may be embedded in other documents via active document technology (see e.g., http://msdn dot Microsoft dot com/en-us/library/6bzz39ft%28v=vs.71%29.aspx). The containment of interface widgets within a user interface sketch can be automatically determined and translated into a containment tree for purposes of user interface (UI) generation (see http://www dot wipo dot int/pctdb/en/wo.jsp?IA=IB2004052069&DISPLAY=DESC). While the existing visualization of containment may provide various two dimensional and three dimensional tree views, the creation of containers is fixed in those systems. Although a few folder styles may be made available, e.g., picking a folder color to indicate degree of importance, the current systems do not provide a way to have a completely different visual representation for the folder/container itself. For instance, no current system allows the user to flexibly create containers by merely sketching one or more arbitrary marks on an interactive surface.

BRIEF SUMMARY

A graphical user interface system and method may be provided for mark-based electronic containment. The system, in one aspect, may include a graphical user interface module operable to enable a user to indicate one or more container markings, the container markings having attributes of an electronic container.

A method of providing a mark-based containment system, in one aspect, may include receiving an indication of a mark as a container marking. The method may also include attributing, by a processor, one or more container attributes to the container marking. The method may further include storing the container mark and the container attributes associated with the container mark.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A mark-based electronic containment system and method may be provided. Such a system may provide high flexibility for the users. For example, if the user wanted to create envelope-like containers, the user could sketch one and use it (and/or copies of it) to hold other items including pointers to documents or other marks that could also be containers. For instance, if the user wanted a purse-like container to represent a meaningful item to them (e.g., where they put electronic coupons for use in subsequent shopping), the user could sketch a purse as an icon or mark. Any mark, or recognizable region within a mark, or ensemble of marks (where recognition is either algorithmic or based on a user selection of a portion of an existing mark or ensemble of marks) could be, if given what can be thought of as a "can-contain" attribute, a container.

Figure 1:
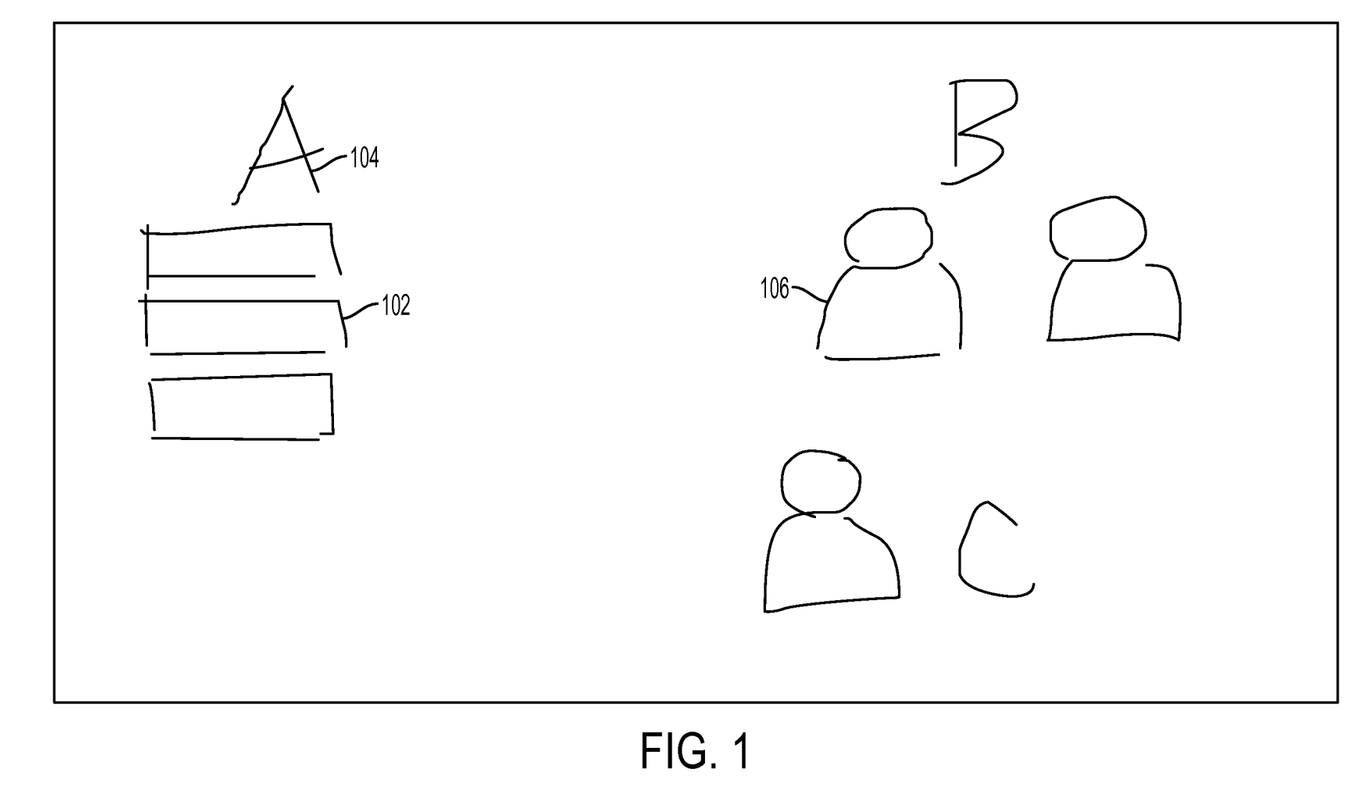
FIG. 1 shows examples of marks that may be sketched and defined as electronic containers in one embodiment of the present disclosure.
Figure 2:
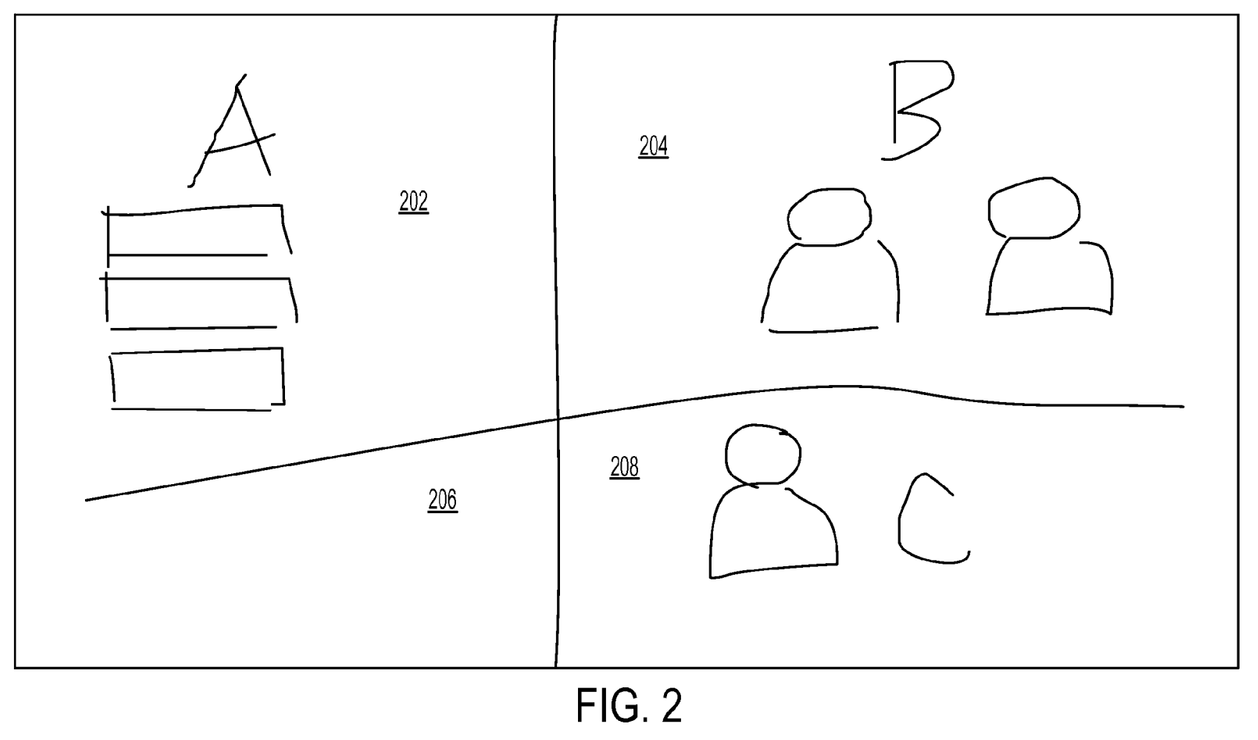
FIG. 2 shows two intersecting lines forming the four regions as examples of marks in one embodiment of the present disclosure.

FIG. 1 shows examples of marks. They may include a geometric shapes (e.g., 102), alphabetical letters (e.g., 104), or any type of figures (e.g., 106). As another example, the "tick" marks on a timeline or axis of a sketched graph could serve as containers for pointers to documents associated with that time period or data point. As another example, the four regions created by two intersecting lines, for example, one horizontal line and one vertical line denoting a two by two matrix, could serve as containers for pointers to documents or other marks or ensembles of marks. FIG. 2 shows such two intersecting lines forming the four regions 202, 204, 206, 208.

As yet another example, cells defined by the intersecting horizontal and vertical lines marking a grid could each be a container.

The mark-based electronic containment system may add containment to other features and established benefits of sketch-based systems. The act of sketching requires little cognitive overhead so it does not unduly impede the flow of creative work. The creation of what will become a container mark and the giving of that mark the "can-contain" attribute could be separated in time. Thus, the indication that the sketched or created mark is to be a container may occur at the time of the creation of the mark or later in time. There is no need to indicate at the time of the marking (e.g., drawing or sketching) that the mark is to be a container. Making it a container can happen at a suitable time later, through explicit user action, automatic analysis, or a combination of both. This will help users stay in the flow of sketching.

Figure 7:
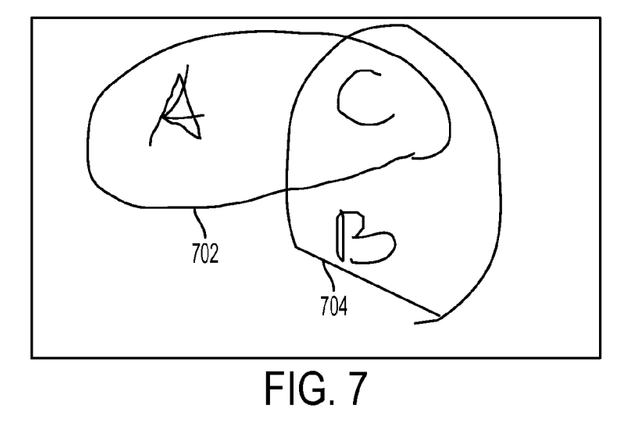
FIG. 7 illustrates an example of overlapping ellipses as container markings.

In one embodiment of the present disclosure, advanced scenarios may be supported. For example, a system in one embodiment of the present disclosure may allow a user to draw two overlapping closed (or nearly closed) marks, such as ellipses, and then use the three regions thus defined as containers. In this case, the user would be using the overlapping containers in a way analogous to the concept of overlapping regions in a Venn diagram. FIG. 7 illustrates an example of overlapping ellipses 702, 704.

Marks, moreover, need not leave physical traces (such as electronic ink) in order to be used as containers. A mark can be a gesture in 3-D space captured by a vision system or accelerometers. Or it can be a region indicated on a 2-D surface or along a 1-D line. If the system is in a state to automatically associate such mark making with the "can-contain" attribute, such marks can become containers immediately. The resulting container may be accessed at a future date, for example, based on various visualizations of the containment relationships or by visualizations organizing containers by time of creation, or order of creation, or place of creation.

An explicit containment relationship of the sort discussed in the present disclosure may be different from the implicit containment relationship of, for example, drawing an outline of a floor plan and drawing within it a picture of a chair or table. While such an implicit containment relationship can be turned into an explicit containment relationship (either through subsequent user actions or by way of automatic analysis) it need not be.

In one embodiment of the present disclosure, a user's mark (e.g., a drawing, sketch) may be given an attribute of an electronic container. For instance, a mark may be given an attribute of "can-contain." Upon creation of a mark, the system of the present disclosure may automatically save it with an attribute of an electronic container. Mark features may be used to infer containment type or properties, e.g., in which red circles are taken as denoting containers holding urgent items and green circles are taken as denoting containers holding non-urgent items. The inferring may be automatic in that a system of the present disclosure in one embodiment may automatically detect a different color and associate with different degrees of urgency or other attributes. The mark may be drawn on an interactive surface, e.g., by a computer input device (e.g., via a mouse, touch screen, and/or other devices), which a processor may automatically read the input. The mark may be drawn on a static medium (e.g., paper) and then scanned into an electronic system. The mark may be derived through an analysis of non-drawn elements, e.g., ones created by selecting items from a palette in a drawing program. The mark may be a region of another mark. The mark may be a two-dimensional gesture having no visible persistence. An example of this may be circling an area of multiple icons on a virtual desktop with a finger on a touch-sensitive tablet. The mark may be a three-dimensional gesture having no visible persistence. An example of this may be outlining the boundaries of a cube in space by moving the hands within an area equipped with a visual recognition system. The mark may be a point or region in one, two, three, or more dimensions. For example, in the two dimensional space of a touch-sensitive drawing table a point could be indicated by a single finger press exceeding a duration longer than that typically used for a tap. The mark may be an ensemble of multiple marks. The mark may be a copy of another mark.

In one embodiment, the container is made visible after the mark is completed (e.g., drawn or otherwise manifested) even if the mark itself leaves no visible trace. For example, a mark may be drawn in the air (e.g., by gesture) and the resulting container may be shown on a display screen by the system of the present disclosure that detects or reads the gesture and renders it on the display screen.

A mark may contain a pointer or pointers to an electronic document or documents; an identifier or identifiers of a physical document or documents; an identifier or identifiers of electronic documents stored on a system not directly accessible from the mark (entering, for example, a character string denoting the Dewey Decimal representation of a physical book); another mark or marks; a nested set of marks of arbitrary depth; a combination of any of the above.

Figure 3:
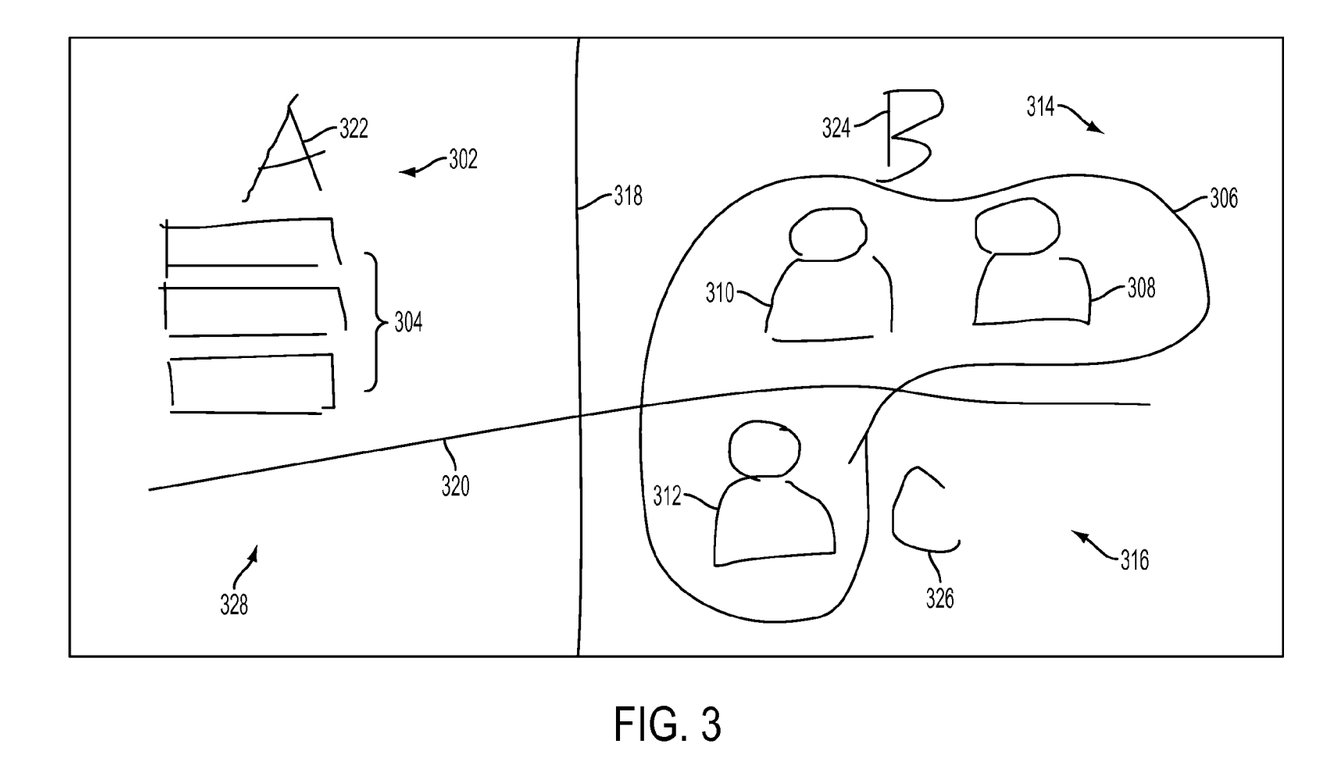
FIG. 3 illustrates five regions as containers with items contained therein.

In one embodiment of the present disclosure, the containment relationship between a mark and another entity may be denoted directly by the user through interactive means such as dragging and dropping or by clicking on a menu item. The containment relationship between a mark and another entity may be derived by means of visual analysis identifying which marks are containers and which entities are contained within them. For instance, FIG. 3 illustrates five regions with items contained therein. An automatic computer processing may analyze the items contained in a region and automatically derive the relationship between, for instance, a first quadrant region 302 as a container and the three rectangles 304 and the letter A contained therein. Item at 306 may be recognized as a container mark containing the objects at 308, 310, and 312. At the same time, a container that is represented by the quadrant region 314 may contain the objects 308 and 310 and the letter B. Similarly, a container represented as the quadrant region 316 may contain the object at 312 and the letter C. Another region at 306 contains objects 308, 310, 312. Quadrant region 328 illustrates another example of a region, an empty one (no objects contained therein). Markings shown at 318 and 320 illustrate an example of quadrant making marks. Markings shown at 322, 324 and 326 are examples of marks that could possibly be read by system or human as labels. Any marks may be interpreted as container marks. The user may explicitly denote any mark as a container.

The containment relationship between a mark and another entity may be derived by means of a rule specifying that electronic documents or marks meeting the rule definition are automatically contained when they are created or when they become available (e.g., through receipt of an electronic mail item). For instance, a mark may be created as a container, for example, given a "can-contain" attribute. A rule may be specified for this container (e.g., at the time of creation or later), that entities meeting a predetermined criteria are to be contained in the mark when created or otherwise made available. An example may be emails with predetermined attributes, such as "from", "to", "subject" and other fields that satisfy the specified rule.

The containment relationship between a mark and another entity may be derived by means of a query selecting a set of existing electronic documents or marks for containment. For example, a user may be query a computer system for documents that might be contained in the mark and then select the desired documents from the set of documents returned from the query.

The containment relationship between a mark and another entity may be derived by means of a text string indicating that documents or other marks associated with that text string are to be contained. As one example a user interface might allow a text string to be entered and the names of all documents containing that string might then be returned for inclusion within the container. As another example, a system might allow all entities having an associated "tag" matching a text string be returned for inclusion within the container.

In one embodiment, a region representing a mark may be denoted by way of explicit user selection of a portion of a mark. The region representing a mark may be derived algorithmically (e.g., by subdividing a mark at the point of maximum curvature or at equally spaced points along its length). The region representing a mark may be derived algorithmically through an analysis of regions implied by marks that overlap other marks. The region representing a mark may be derived algorithmically through an analysis of regions implied by marks that are spatially near other marks. The region representing a mark may be derived algorithmically through an analysis of regions implied by marks that share features with other marks.

A system of the present disclosure in one embodiment may recognize or detect a mark (e.g., to be used as a container) by the similarity of mark features. Similarity may include similarity of color, similarity of mark shape, similarity of mark orientation, similarity of mark size, similarity of mark style (such as dashed or dotted line), or similarity of mark width, or combinations of these or related features.

Mark features may include, but are not limited to, color, shape, orientation, size, width, and style (such as dashed or dotted line).

In another aspect, a graphical user interface may be provided which allows a user to sketch and otherwise indicate a mark. For instance, the methodology and/or system of the present disclosure may include a graphical user interface or the like tool for enabling a user to input a mark (e.g., by drawing, gesturing, selecting from a set of available drawings, etc.). The methodology and/or system of the present disclosure may then associate the mark as a container, e.g., by giving a "can-contain" attribute to the mark. The graphical user interface may be a part of a computer or a processor. The one or more user made container markings may be on the graphical user interface, the container markings having the attributes of an electronic container.

In one aspect, one or more of the container markings persistently retains the attributes of an electronic container upon the occurrence of any one or more of the following: a creation of one or more other containers; a deletion of one or more other containers, an addition of one or more objects to the container marking, a deletion of one or more objects to the container marking, a copying of one or more objects in the container marking, a modification of one or more objects in the container marking.

The container markings may contain one or more child containers. The container markings may be contained by one or more parent containers. As discussed above, the container markings may be represented as a closed figure, an open figure, or a combination of both. In another aspect, one or more objects may be contained in the container marking if the contained object is close to the container marking. Closeness may be determined as, e.g., within some distance or proximity, e.g., within a distance less than the width of the bounding box of the mouse pointer. Inferences about what is contained may be determined by the following, but are not limited to only these rules: e.g., things in proximity get "pulled" into the container, the strength of the pull can be based on attributes of the already contained marks, a distance metric explicitly defined by the user, the definition of the containing mark attributes gets modified based on the what is pulled in.

Container attribute may include a color, a set designation, a file name, a fixed size (e.g., maximum number of objects a mark (also referred to as a container marking) can hold or contain), a set of tags which allows for attributing any semantics to the mark, a numeric (or other) identifier, an association with one or more existing containers or a set of containers. The attributes may be stored as a database and/or another persistent data store.

Yet in another aspect, mark features may be used to infer containment type or properties. For example, red circles may be taken as denoting containers holding urgent items and green circles may be taken as denoting containers holding non-urgent items.

Figure 4:
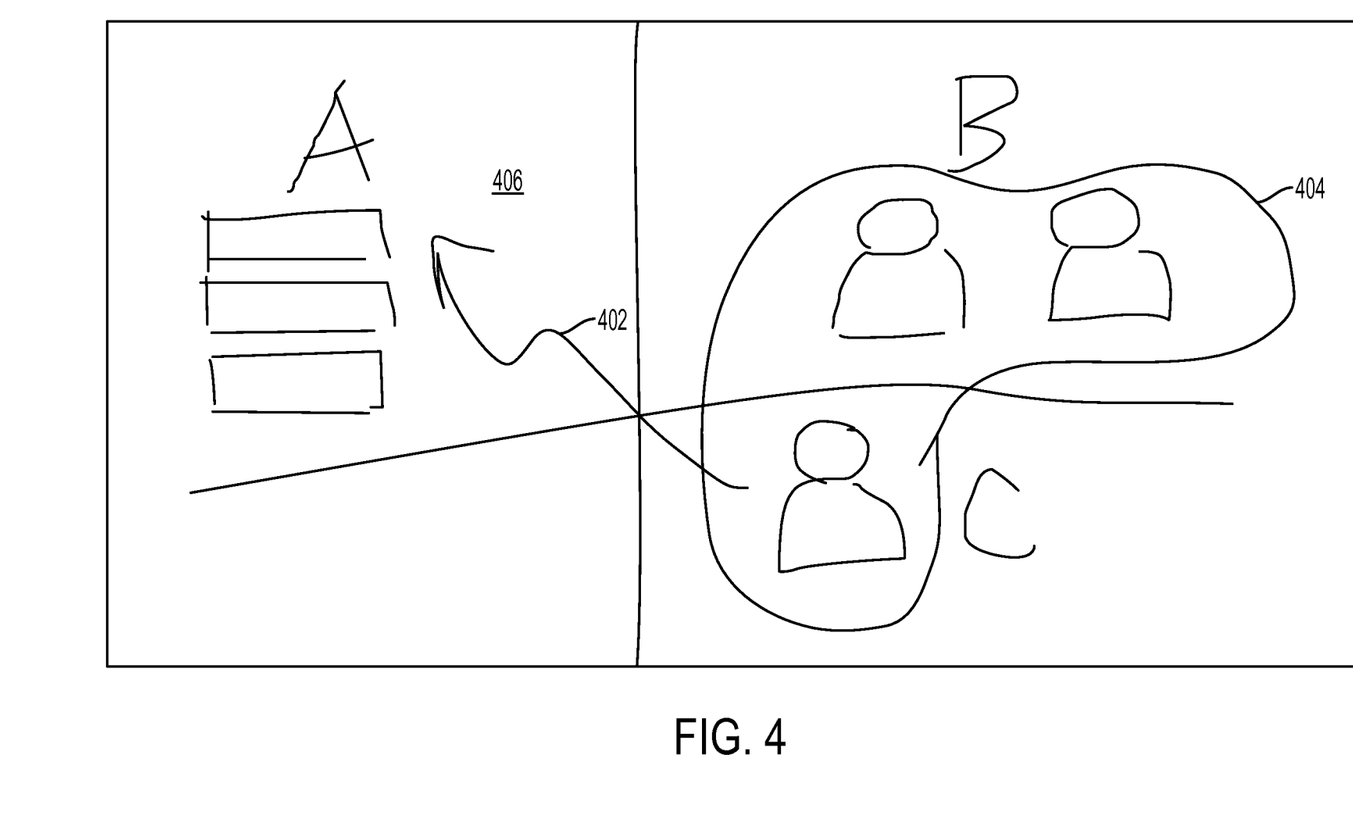
FIG. 4 illustrates an example of container markings, objects contained therein and moving of a container.

Still yet in another aspect, two or more container markings may contain one or more of the same objects. The graphical user interface may also enable moving of one or more objects from a first container marking to a second container marking, i.e., from one container to another container. FIG. 4 illustrates an example of container markings, objects contained therein and moving of a container. For instance, the arrow 402 shows a moving of a container mark 404 to another container 406. A graphical user interface, for instance, may enable a user to select one or more container marks and/or objects and drag and drop them into another container mark.

Figure 5:
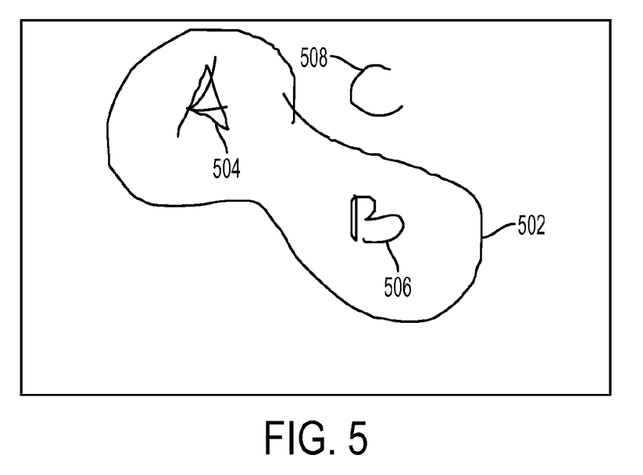
FIG. 5 shows an example of defining a container marking that includes objects.
Figure 6:
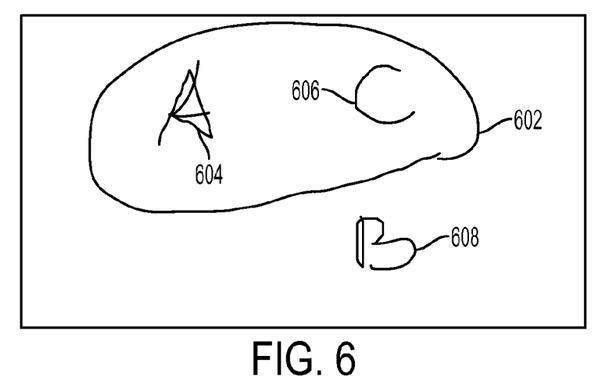
FIG. 6 shows another example of defining a container marking that includes objects.

As discussed above, one or more of the container markings may be defined by one or more of the following: a line, more than one intersecting lines, a box, a circle, an arbitrary shape, a glyph, an arbitrary image, another indication. FIG. 5 shows an example of defining a container marking that includes objects 504, 506. Item 508 may be another object or container marking. FIG. 6 shows another example of defining a container marking 602 that includes objects 604, 606. Item 608 may be another object or container marking. The container markings may be determined by one or more user actions. The user actions may include one or more of the following, but not limited to: one or more key strokes, one or more mouse movements, a rate of change of movement, an acceleration of movement, a gesture in three dimensional (3-D) space, like a virtual room or a physical room.

Figure 8:
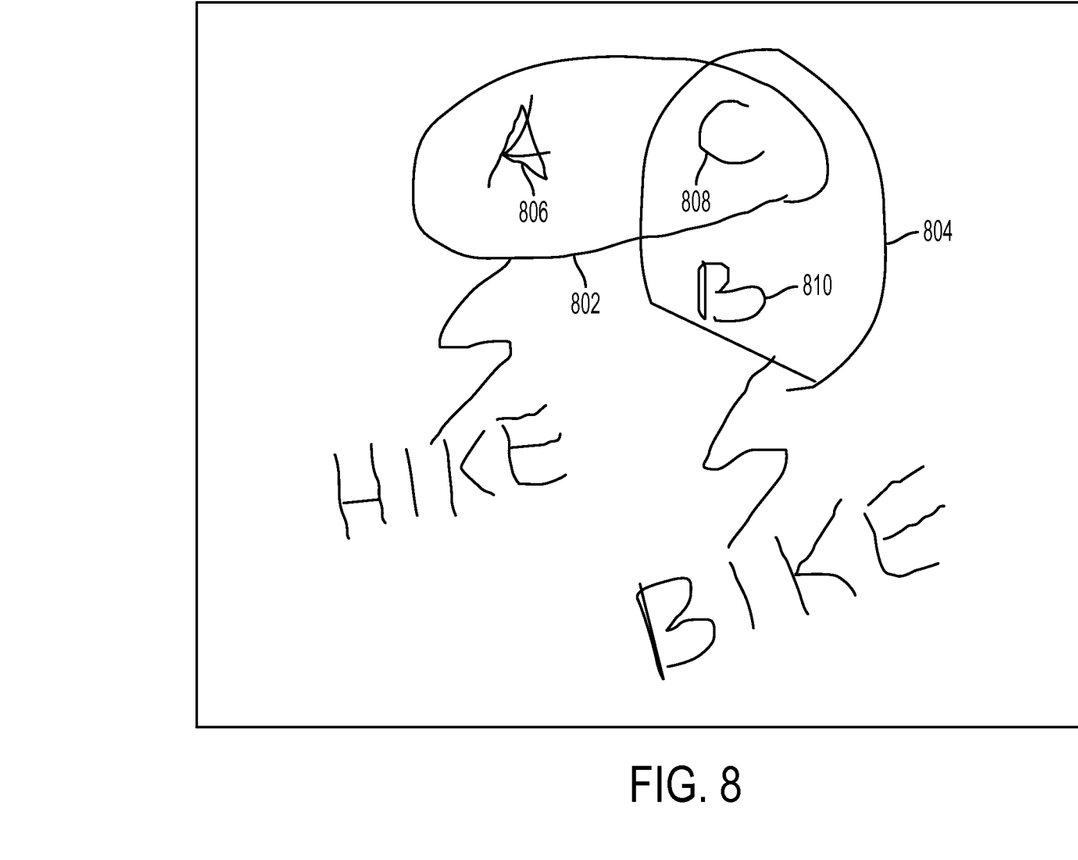
FIG. 8 shows another example of container markings that contain an object in common.

FIG. 8 shows another example of container markings 802 and 804 that contain an object in common. For instance, a container marking 802 may be defined by drawing a shape that contains two items 806 and 808. Another container marking 804 may be defined by sketching a shape around two items 808 and 810. In the example shown, "HIKE" and "BIKE" is each a series of marks that may be interpreted by human or system as labels.

A graphical interface module may also enable a user to retrieve or select one or more existing marks or container markings, view the items contained in the container markings, and further perform functions such as adding, deleting, moving, etc. of the items or marks.

Figure 9:
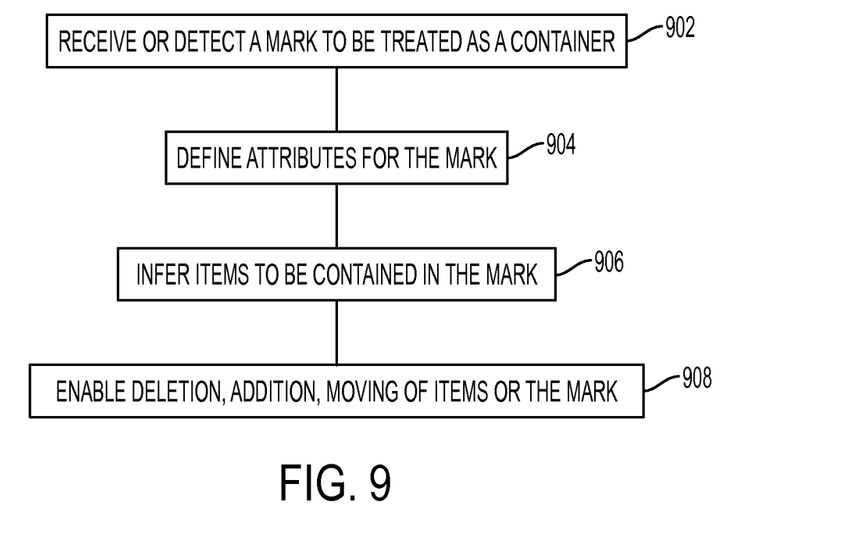
FIG. 9 is a flow diagram illustrating a method of providing a mark-based electronic containment system in one embodiment of the present disclosure.

FIG. 9 is a flow diagram illustrating a method of providing a mark-based electronic containment system in one embodiment of the present disclosure. At 902, a container marking defined by a user is received. For example, a user may define a mark as a container, for instance, by drawing or gesturing or otherwise indicating a mark. In one aspect, a graphical user interface may be provided that allows a user to input one or more of such marks. The graphical user interface may, for instance, receive or detect a mark and save it as data with attributes of a container at 904. Other items, for instance, existing or sketched on an interactive surface of the graphical user interface may be inferred as items to be contained in the defined mark at 906. Such inference may be based on rules of proximity, similarity, and/or other rules. At 908, items contained in a container marking may be moved or deleted, or new items added, or otherwise manipulated, for instance, according to user control via the graphical user interface.

Figure 10:
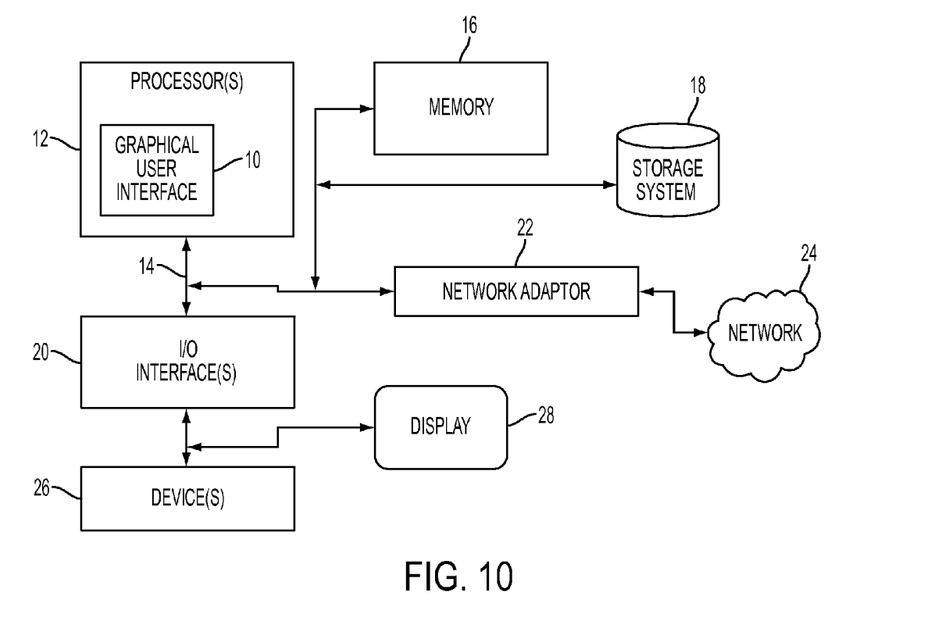
FIG. 10 illustrates a schematic of an example computer or processing system that may implement the mark-based electronic containment system in one embodiment of the present disclosure.

FIG. 10 illustrates a schematic of an example computer or processing system that may implement the mark-based electronic containment system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a graphical user interface module 10 for a mark-based electronic containment system module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20. The user interface screen, for example, may be presented on the display device 28, for enabling sketching of the marks and defining them as containers and also specifying the items or objects to be contained in the marks. I/O interfaces 20 may facilitate detecting of gestures or movements by the graphical interface module 10 and defining the gestures as marks.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A graphical user interface system, comprising:
a processor; and
a graphical user interface module operable to execute on the processor and further operable to enable a user to indicate one or more container markings defined by the user for creating an electronic container, the graphical user interface module further operable to allow the user to define attributes to associate with the electronic container.

2. The system of claim 1, wherein one or more of the container markings persistently retain the attributes of the electronic container upon occurrence of one or combinations of: a creation of one or more other containers, a deletion of one or more other containers, an addition of one or more objects to one or more of the container markings, a deletion of one or more objects to one or more of the container markings, a copying of one or more objects in one or more of the container markings, a modification of one or more objects in one or more of the container markings.

3. The system of claim 1, wherein one or more of the container markings contain one or more child containers.

4. The system of claim 1, wherein one or more of the container markings is contained by one or more parent containers.

5. The system of claim 1, wherein one or more of the container markings is a closed figure, an open figure, or a combination thereof.

6. The system of claim 5, wherein one or more objects are determined to be contained in one or more of the container markings:
if said one or more objects are within a predetermined proximity of one or more of the container markings;
based on a strength of a pull attributed to one or more of the container markings; or
a distance metric explicitly defined by a user.

7. The system of claim 1, wherein the container attributes include a color, a set of designations, a file name, or combinations thereof.

8. The system of claim 1, wherein two container markings contain one or more of same objects.

9. The system of claim 1, wherein one or more of the container markings is defined by one or more of a line, more than one intersecting lines, a box, a circle, an arbitrary shape, a glyph, an arbitrary image, or combinations thereof.

10. The system of claim 1, wherein one or more of the container markings are determined by one or more user actions.

11. The system of claim 10, wherein the user actions include one or more of: one or more key strokes, one or more mouse movements, a rate of change of movement, an acceleration of movement, a gesture in 3-D space, or combinations thereof.

12. A method of providing a mark-based containment system, comprising:
receiving an indication of a mark defined by a user as a container marking to represent an electronic container for creating the electronic container;
attributing, by a processor, one or more container attributes to the container marking; and
storing the container marking and the container attributes associated with the container marking.

13. The method of claim 12, wherein mark features are used to automatically infer containment type or properties for attributing to the electronic container that is created.

14. The method of claim 12, wherein the container attributes comprise a fixed size including maximum number of objects the container mark can contain, a set of tags specifying semantics, a numeric identifier, an association with one or more other containers, shape, shape orientation, shape width, shape size, or combinations thereof.

15. The method of claim 12, wherein the mark is drawn on an interactive surface, the mark is drawn on a static medium and scanned into an electronic system, the mark is derived through an analysis of non-drawn elements, the mark is a region of another mark, the mark is a 2-dimensional gesture having no visible persistence, the mark is a 3-dimensional gesture having no visible persistence, the mark is a point or region in one, two, or three, or more dimensions, the mark is an ensemble of multiple marks, or the mark is a copy of another mark, or combinations thereof.

16. The method of claim 15, wherein the container marking is made visible after the mark is completed even if the mark itself leaves no visible trace.

17. The method of claim 12, wherein the container marking contains:
a pointer or pointers to an electronic document or documents;
an identifier or identifiers of a physical document or documents;
an identifier or identifiers of electronic documents stored on a system not directly accessible from the mark;
another mark or marks;
a nested set of marks of arbitrary depth; or
combinations thereof.

18. The method of claim 12, wherein a containment relationship between the mark and another entity is denoted directly by a user through interactive user actions; is derived by visual analysis identifying which marks are containers and which entities are contained within them; is derived by a rule specifying that electronic documents or marks meeting one or more rule definitions are automatically contained when they are created or when they become available; is derived by a query selecting a set of existing electronic documents or marks for containment; is derived by means of a text string indicating that documents or other marks associated with that text string are to be contained.

19. The method of claim 12, wherein the mark is determined to be a region, wherein the region is: denoted by an explicit user selection of a portion of the mark; derived algorithmically; derived algorithmically through an analysis of regions implied by marks that overlap other marks; derived algorithmically through an analysis of regions implied by marks that are spatially near other marks; or, derived algorithmically through an analysis of regions implied by marks that share features with other marks.

20. The method of claim 12, wherein the mark is determined to be a region derived algorithmically through an analysis of regions implied by marks that share features with other marks, the features shared with other marks determined based on similarity of color; similarity of mark shape; similarity of mark orientation; similarity of mark size; similarity of mark width; similarity of mark style; or combinations thereof.

21. A computer readable storage medium, excluding signal per se, storing a program of instructions executable by a machine to perform a method of providing a mark-based containment system, comprising:

receiving an indication of a mark defined by a user as a container marking to represent an electronic container for creating the electronic container;

attributing, by a processor, one or more container attributes to the container marking; and storing the container marking and the container attributes associated with the container marking.

22. The computer readable storage medium of claim 21, wherein mark features are used to automatically infer containment type or properties for attributing to the electronic container that is created.

23. The computer readable storage medium of claim 21, wherein the container attributes comprise a fixed size including maximum number of objects the container mark can contain, a set of tags specifying semantics, a numeric identifier, an association with one or more other containers, shape, shape orientation, shape width, shape size, or combinations thereof.

24. The computer readable storage medium of claim 21, wherein the mark is user drawn or gestured.

* * * * *